Figure 1:
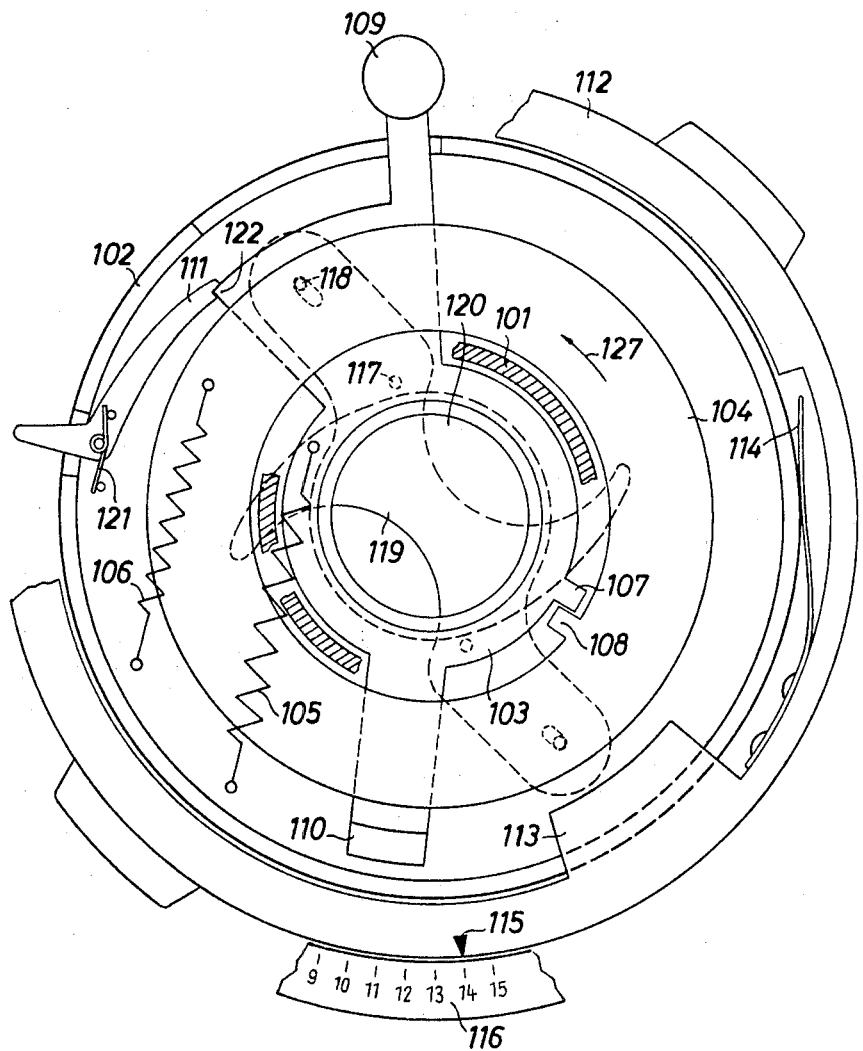

Sept. 20, 1966            G. KIPER            3,273,481

CENTRAL PHOTOGRAPHIC SHUTTER

Filed Feb. 20, 1964

INVENTOR.

GERD KIPER

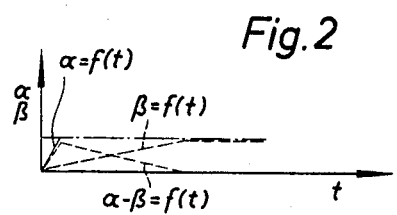
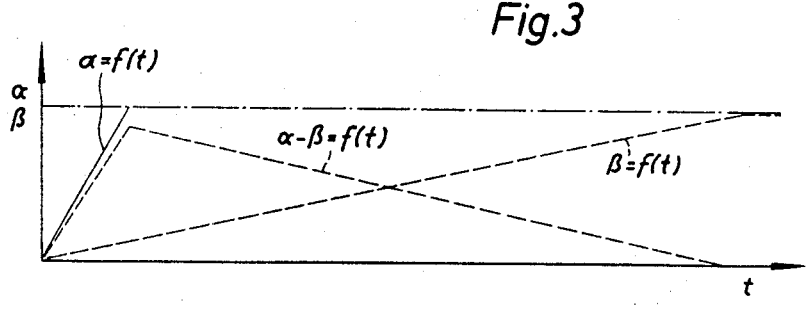

United States Patent Office 3,273,481
Patented Sept. 20, 1966

3,273,481
CENTRAL PHOTOGRAPHIC SHUTTER
Gerd Kiper, Unterhaching, near Munich, Germany, assignor to Agfa Aktiengesellschaft, Leverkusen-Bayerwerk, Germany
Filed Feb. 20, 1964, Ser. No. 346,251
Claims priority, application Germany, Mar. 7, 1963, A 42,526
5 Claims. (Cl. 95—63)

This invention relates to a central photographic shutter in which the shutter sectors are opened and closed by changing the angular phase between the pair of concentric rings to which they are operatively connected, and it more particularly relates to such a shutter in which the sectors remain closed as their operating rings are simultaneously wound up to tension their separate driving springs and then are opened and closed during the spring-driven return movement of these rings.

In U.S. Patent No. 3,099,197, is shown a central photographic shutter in which the exposure time is effected by retarding one of a pair of simultaneously moving sectors operating rings. The degree of opening and closing is controlled by connecting one of the retarding means to the diaphragm, and adjusting the setting of the diaphragm.

An object of this invention is to provide a central photographic shutter arrangement of the type shown in U.S. Patent No. 3,099,197, in which the diaphragm arrangement is eliminated.

A further object of this invention is to provide such a simple and economical central photographic shutter in which the shutter opening and exposure time are adjustable.

In accordance with this invention the distance of travel of the opening sector operating ring is controlled by an adjustable stop. The closing sector operating ring begins moving simultaneously with the opening ring but moves at a slower angular velocity. Consequently for shorter exposure times the distance of travel is made small; and conversely for longer exposure times the distance is made larger.

In an advantageous form of this invention the adjustable stop includes a stop member in the path of motion of a lug on the sector opening ring. The stop member may be mounted on an adjustably mounted ring attached to the shutter housing. The adjustable ring may have an index marker to indicate the various distances in accordance with a scale on the housing. A leaf or friction spring may space the adjustable ring from the housing.

In accordance with one aspect of this invention, the sector closing ring may move at a slower speed by virtue of a weaker driving spring. In another aspect of the invention the sector closing ring may move slower by having an inertia mass coupled to it.

Novel features and advantages of the present invention will become apparent to one skilled in the art from a reading of the following description in conjunction with the accompanying drawings wherein similar reference characters refer to similar parts and in which:

FIG. 1 is a sectional view in elevation taken through a shutter which is one embodiment of this invention; and FIGS. 2 and 3 are diagrams showing the relative angular phases of the opening and closing sector rings with shorter and longer distances of travel respectively.

In FIG. 1 is shown a shutter housing 102 upon which sector operating rings 103 and 104 are concentrically mounted upon opposite sides of annular projections 101. A number of shutter sectors 119 and 120, of which only two are shown for simplicity of presentation, are rotatably connected to rings 103 and 104 by pins 117 and 118. Ring 103 includes a radially extending driving projection 107 and a longer radially extending arm having lug 110 thereon. A driving spring 105 of the tension type reacts between ring 103 and a portion of housing 102. Ring 104 includes an inwardly extending lug 108 which engages driving projection 107 upon ring 103. Driving spring 106 of the tension type also reacts between ring 104 and the stationary portion of housing 102. An arresting stop or abutment member 113 extends from adjusting ring 112 in the path of movement of lug 110 to stop rings 103 and 104 in the fully released position. Winding or tensioning lever 109 connected to ring 103 extends through the side of shutter housing 102 for movement between a pair of motion limiting surfaces. When lever 109 is moved clockwise to the position shown in FIG. 1, driving springs 105 and 106 are tensioned. When the lever is in the position shown in FIG. 1 an edge 122 of sector control ring 103 is engaged by lever 111 which is held in the engaged position by spring 121.

Operation

The shutter is wound or tensioned by rotating tensioning lever 109 clockwise as shown in FIG. 1 to tension driving spring 105. Driving projection 107 on ring 103 also moves lug 108 clockwise to simultaneously tension driving spring 106 of ring 104. As lever 109 approaches the position shown in FIG. 1, lever 111 engages edge 122 to latch the rings in the cocked condition against the tension of the driving springs. Adjusting ring 112 is then moved until marker 115 is at the desired valve on scale 116 to thereby control the exposure time and the shutter opening. When the end of lever 111 which projects through housing 102 is depressed, edge 122 is released thereby permitting driving springs 105 and 106 to move rings 103 and 104, respectively, in the direction indicated by the arrow 127. Opening ring 103 moves freely until lug 110 contacts stop member 113. Closing ring 104, however, moves at a slower angular velocity than ring 103. This slower velocity may be accomplished in a number of advantageous ways. In one advantageous way drive spring 106 for ring 104 is weaker than drive spring 105. Another advantageous manner of imparting slower angular velocity to ring 104 is to provide the ring with an inertia mass so that driving spring 106 cannot move ring 104 as quickly as driving spring 105. Where a retarding means is equally divided over ring 104, imbalance is avoided and the retarded motion is constant throughout its entire distance of movement. However where the retarding means is adjustably coupled to sector ring 104 varied exposure times can be obtained in accordance with the particular shutter openings.

FIGS. 2 and 3 indicate the relative shutter opening and exposure time in accordance with the setting of adjusting ring 112. In FIGS. 2 and 3 the abcissa indicates the time of travel $t$ of each ring while the ordinate indicates the angular phase $\alpha$ and $\beta$ of rings 103 and 104, respectively. The dotted horizontal line in each figure indicates the angle at which lug 110 contacts stop 113 on ring 103, and lug 108 contacts projection 107 for ring 104. As is readily apparent, the sector opening $(\alpha-\beta)$ is greatest when $\alpha$ first reaches the horizontal dotted line; and the sector opening then diminishes to zero when $\beta$ reaches the horizontal dotted line. FIG. 2 shows the relatively shorter exposure time and smaller shutter opening when adjusting ring 112 is at a lower setting on scale 116 than the setting for FIG. 3.

What is claimed is:

1. A photographic shutter of the central type comprising a housing, a pair of rotatably mounted concentric sector operating rings in said housing, a number of shutter sectors, each of said sectors being movably connected to both of said rings to cause them to open and close said sectors when the angular phase between said rings varies from the normal condition and returns to it, driving means connected to each of said rings for imparting separate driving forces to them, releasing means connected to said rings for causing said rings to commence their driven movement, said driving means for one of said rings moving it at a slower angular velocity than said driving means for the other of said rings, adjustable stop means connected to said housing for controlling the distance of motion of said rings whereby the shutter opening and exposure time may be varied in accordance with the adjustment of said stop means, said adjustable stop means comprising a lug on the opening ring of said pair of rings, an abutment member in the path of motion of said lug, an adjusting ring movably mounted on said housing, and said abutment member being on said adjusting ring.

2. A photographic shutter as set forth in claim 1 wherein indicating means are on said housing and said adjusting ring to indicate the distance of travel of said opening ring.

3. A photographic shutter as set forth in claim 1 wherein friction means connects said adjusting ring to said housing.

4. A photographic shutter as set forth in claim 3 wherein said friction means comprises a leaf spring connected to said adjusting ring and reacting against said housing.

5. A photographic shutter as set forth in claim 1 wherein said slower angular velocity is imparted to said other of said rings by retarding means coupled to it.

References Cited by the Examiner
UNITED STATES PATENTS

| | | | |
|---|---|---|---|
| 2,578,604 | 12/1951 | Santoni | 95—63 |
| 2,890,640 | 6/1959 | Noack | 95—63 |
| 3,099,197 | 7/1963 | Kiper | 95—63 |

JOHN M. HORAN, *Primary Examiner.*